United States Patent
Yue et al.

(10) Patent No.: US 12,147,650 B2
(45) Date of Patent: Nov. 19, 2024

(54) WINDOW ARRANGEMENTS USING TABBED USER INTERFACE ELEMENTS

(71) Applicant: Microsoft Technology Licensing, LLC, Redmond, WA (US)

(72) Inventors: Leo Tian Yue, Redmond, WA (US); Kenneth Martin Tubbs, Jr., Issaquah, WA (US); Stacy Diane Carson, Seattle, WA (US); Peter Josef Kreiseder, Redmond, WA (US); Bret Paul Anderson, Seattle, WA (US); Sailesh Dahal, Bellevue, WA (US); Neil Agarwal, Seattle, WA (US); Gregory Thomas Mattox, Jr., Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 6 days.

(21) Appl. No.: 17/855,235

(22) Filed: Jun. 30, 2022

(65) Prior Publication Data
US 2024/0004524 A1 Jan. 4, 2024

(51) Int. Cl.
G06F 3/0483 (2013.01)
G06F 3/04842 (2022.01)
G06F 9/451 (2018.01)

(52) U.S. Cl.
CPC ........ G06F 3/0483 (2013.01); G06F 3/04842 (2013.01); G06F 9/453 (2018.02)

(58) Field of Classification Search
CPC ..... G06F 3/0483; G06F 3/04842; G06F 9/453
See application file for complete search history.

(56) References Cited

U.S. PATENT DOCUMENTS

| | | | | |
|---|---|---|---|---|
| 6,166,736 A | * | 12/2000 | Hugh | G06F 3/0481 715/777 |
| 2006/0218500 A1 | * | 9/2006 | Sauve | G06F 3/0481 715/767 |
| 2006/0230356 A1 | * | 10/2006 | Sauve | G06F 3/0481 715/777 |
| 2008/0184158 A1 | * | 7/2008 | Selig | G06F 40/174 715/781 |

(Continued)

OTHER PUBLICATIONS

"International Search Report and Written Opinion issued in PCT Application No. PCT/US23/022490", Mailed Date: Aug. 23, 2023, 14 Pages.

*Primary Examiner* — Matthew Ell
*Assistant Examiner* — Alvaro R Calderon, IV

(57) ABSTRACT

Methods and systems for controlling window arrangements for tabbed user interface elements. An example method includes displaying a plurality of application windows including at least one application window for a web browser application having multiple open tabs, the multiple open tabs including at least one active tab and multiple inactive tabs, receiving an input to invoke a snap assist mode; in response to the input, display a snap assist user interface to reconfigure the display of one or more the plurality of the application windows, the snap assist user interface including tab representations and an application-window representation. In response to receiving a selection of a tab representation, a web browser application window is displayed with the corresponding tab as the active tab.

15 Claims, 14 Drawing Sheets

(56) References Cited

U.S. PATENT DOCUMENTS

| | | | | |
|---|---|---|---|---|
| 2010/0146431 A1* | 6/2010 | Raji | G06F 3/0481 | 715/781 |
| 2012/0054648 A1* | 3/2012 | Morris | G06F 3/0481 | 715/764 |
| 2012/0066628 A1* | 3/2012 | Ens | G06F 16/9577 | 715/769 |
| 2013/0346912 A1* | 12/2013 | Buening | G06F 3/0482 | 715/783 |
| 2014/0164957 A1* | 6/2014 | Shin | H04L 65/403 | 715/806 |
| 2014/0282231 A1* | 9/2014 | Foreman | G06F 9/451 | 715/792 |
| 2016/0034155 A1* | 2/2016 | Vranjes | G06F 3/04842 | 715/803 |
| 2016/0034156 A1* | 2/2016 | Vranjes | G06F 3/04842 | 715/800 |
| 2016/0034157 A1* | 2/2016 | Vranjes | G06F 3/04883 | 715/798 |
| 2016/0034159 A1* | 2/2016 | Vranjes | G06F 3/04842 | 715/803 |
| 2016/0103793 A1* | 4/2016 | Fang | G06F 3/0483 | 715/234 |
| 2016/0124595 A1* | 5/2016 | Kim | G06F 3/04842 | 715/769 |
| 2016/0202852 A1* | 7/2016 | Park | G06F 3/04845 | 715/781 |
| 2016/0357363 A1* | 12/2016 | Decker | G06F 3/04842 | |
| 2017/0075528 A1* | 3/2017 | Kothari | G06F 3/0482 | |
| 2017/0118135 A1* | 4/2017 | Boodhoo | H04L 67/54 | |
| 2017/0285894 A1* | 10/2017 | Barrus | G06F 3/04842 | |
| 2017/0357437 A1* | 12/2017 | Peterson | G06F 40/134 | |
| 2018/0307379 A1* | 10/2018 | Kim | G06F 16/955 | |
| 2018/0365198 A1* | 12/2018 | Kim | G06F 40/197 | |
| 2022/0107712 A1 | 4/2022 | Mattox et al. | | |

* cited by examiner

WINDOW ARRANGEMENTS USING TABBED USER INTERFACE ELEMENTS

BACKGROUND

Recent development in the display technologies has brought diversification in display devices, and consumers now have a plenty of options in choosing display devices. For example, for web-browsing, email and light office work, consumers typically select a 24-inch or 27-inch full high definition (FHD, 1920×1080 pixels) widescreen (e.g., 16:9 aspect ratio) monitor. For photography, content creation or scientific/engineering tasks, consumers opt to select larger (e.g., 32 inches or 43 inches) monitors having a higher screen resolution (e.g., 4K or ultra-high definition (UHD), 3840×2160 pixels) or a 34-inch or 49-inch ultra-widescreen monitor having a 21:9 aspect ratio. As a result, it became common to have more information displayed simultaneously, and multiple application windows may be displayed across the larger display area.

SUMMARY

Aspects of the present technology relate to reconfiguring application windows within one or more displays to more efficiently use display space resources of the display(s). The present technology The present technology integrates tabs of a web browser into application window snap assist features that are provided by an operating system or similar component. For instance, when an application window is snapped and a snap assist mode is invoked, representations of individual tabs from one or more web browser windows are displayed for selection to fill the remainder of the display, in addition to traditional application-window representations. When a tab representation is selected, the corresponding tab may be transferred from a web browser application window and hosted in a new web browser application window, or the web browser application window with the corresponding tab may be presented on the screen with the selected tab activated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
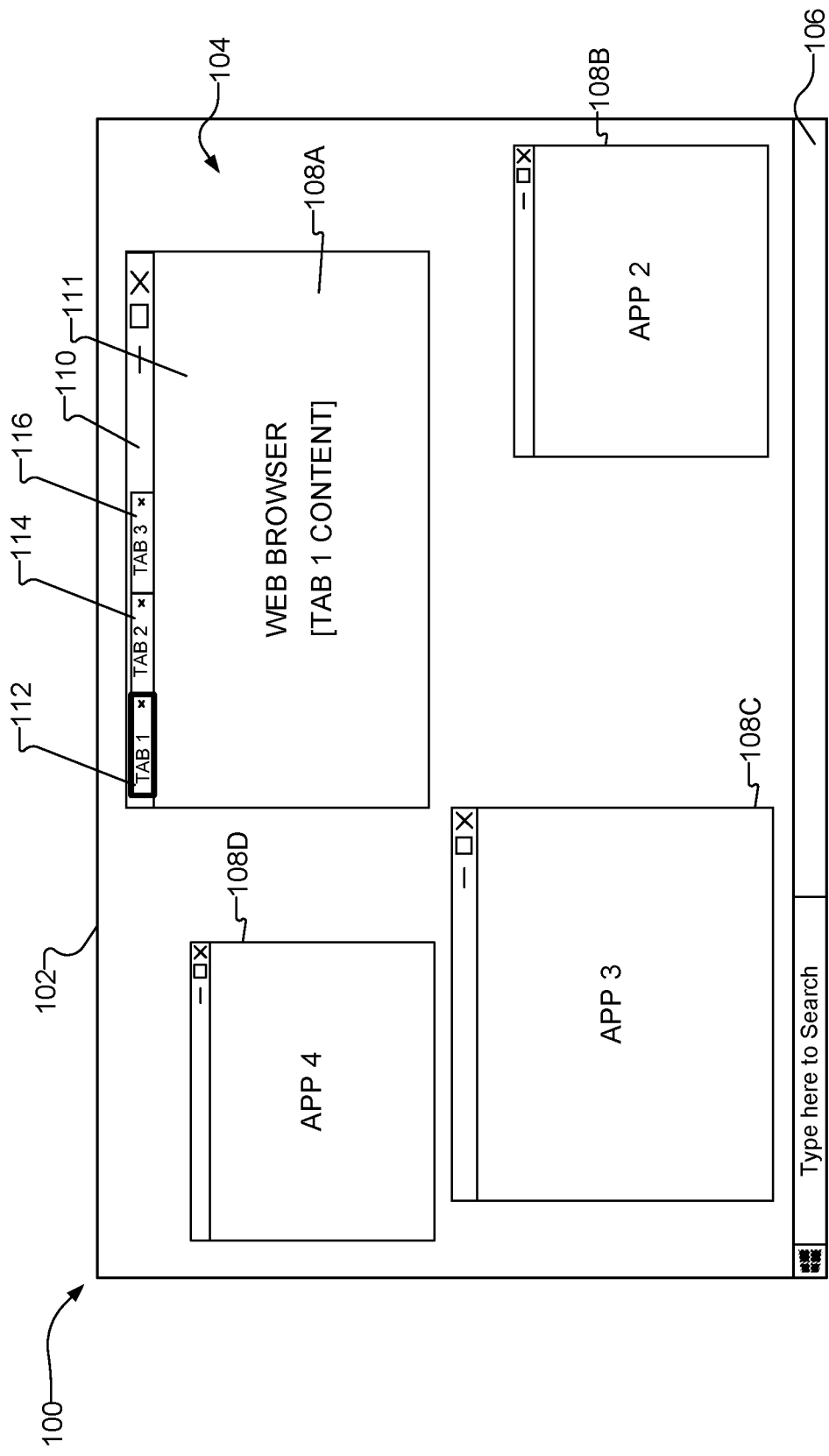
FIG. 1 depicts an example display with a plurality of application windows including a web browser application window.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

As briefly discussed above, increased display areas have allowed for multiple application windows to be opened at any given time to allow for multi-tasking across multiple applications. Controlling the application windows and content of those application windows to efficiently utilize the display area provides a more effective use of the multi-tasking capabilities of the computing device and the operating system.

In addition to using multiple different types of applications, web browsers and the different web sites browsed thereon are also frequently used or switched between. In some instances, users utilize web browsers more than any other application, and interactions with different web sites occur more frequently than interactions with different applications. In general, different web sites are hosted on different tabs of a single application window of the web browser. While this tabbed architecture is helpful for organization, only content from the active tab is shown in the web browser and content from the inactive tabs is hidden behind the active tab. Yet, in many instances, the concurrent display of two different tabs may be useful and increase productivity.

When a user looks to rearrange application windows in the desktop, the user may invoke a snap assist mode that allows a user to snap an application window to another position. Additional application windows may then be selected to fill the remaining portions of the screen. Individual tabs, however, may not be snapped or available in the snap assist mode, which limits the functionality and usefulness of the feature, especially when users often interact with tabbed websites more than any other application. As a result, multiple interactions from the user are required to be processed by the computing device to manually configure multiple web browser windows to configure web sites and tabs that can be concurrently displayed. Such input/output cycles cause a waste of computing resources and creates frustrations for the user due to the technical limitations of the interfaces provided.

For instance, to effectively use a snap assist mode, users need to find their target tab and either drag it out to create a new web browser window containing the tab or make the tab the active tab of the existing web browser window. Both options, due to their disconnect with the snap features and additional cognitive load/effort, can be a detriment to the user's experience and productivity as well as a hinderance for the user's ability to multitask with the web especially when compared to native applications. This can be challenging because browser tabs can be hidden among tens of other browser tabs in a browser window or can even be lost among several browser windows. This is particularly the case for users who engage in productivity tasks, such as information workers or students who often create many tabs for a specific project or task that can persist for many days or weeks. According to customer interviews completed in 2019, users have on average 10-11 tabs when they are at work because productivity often leads to more tabs.

The present technology integrates tabs of a web browser into the snap assist features that are provided by an operating system or similar component. For instance, when an application window is snapped and the snap assist mode is invoked, representations of individual tabs from one or more web browser windows are displayed for selection to fill the remainder of the display, in addition to traditional application-window representations. When a tab representation is selected, the corresponding tab may be transferred from a web browser application window and hosted in a new web browser application window, or the web browser application window with the corresponding tab may be presented on the screen with the selected tab activated. As a result, users are able to identify and select the individual tab(s) that they want displayed quicker and with greater ease due to the improved human-machine interface provided. The improved interface also helps to avoid the computational costs associated with user workarounds such as manually creating a new web browser application window for a tab and the switching of multiple tabs and web browser windows as a user searches for the location of their target tab.

FIG. 1 depicts an example display 100 with a plurality of application windows 108. The example display 100 may be a display of any type of computing device, such as a laptop, desktop, tablet, smartphone, etc. In some examples, the display 100 is an external monitor or display that augments a native display or provides a sole display (such as being connected to a desktop tower). The display 100 displays a variety of components according to the commands and video/image inputs received from the computing device to which the display 100 is connected. The display 100 includes an outer border 102 that surrounds the visual display area (e.g., screen) of the display 100. In some instances, the display 100 includes, or is, a touch-screen device that receives touch inputs from a user.

In the example depicted, the display 100 is displaying a desktop 104 of an operating system such as operating system (OS), such as MICROSOFT WINDOWS, APPLE MS, LINUX, GOOGLE CHROME, etc. A taskbar 106 may be displayed that is configured to display a plurality of icons, search box, network status, date and time, etc. The taskbar 106 is typically placed at the bottom of the user interface, as shown in FIG. 1.

Within the desktop 104, a plurality of application windows 108 are also displayed. More specifically, a first application window 108A, a second application window 108B, a third application window 108C, and a fourth application window 108D are displayed. The application windows 108 may correspond to different applications and/or different instances of the same application. In the example depicted, the first application window 108A is of a web browser application. The other application windows 108B-D may be for different application types. For instance, the second application window 108B may be an application window of a word processing application, and the third application window 108C may be an application window for another productivity application.

Each of the application windows 108 may include a title bar 110 and a content area 111, among other features and/or components. The title bar 110 may include standard features that are common across multiple application windows 108, such as a minimize button, a maximize button, and a close button. In some examples, the title bar 110 may also include features that are specific to the type of application of the respective application window, such as a search bar or field.

The content area 111 provides the content of the application of the application window 108. For example, where the application window 108 is for a web browsing application, the content area 111 may include a display of a web page. Similarly, where the application window 108 is for a word processing application, the content area 111 may display the document that is being created with the word processing application.

Selection of the title bar 110 may allow for the corresponding application window to be moved via a drag-and-drop input. For instance, selecting the title bar 110 of the second application window 108B and holding the selection allows for the second application window 108B to be moved around the desktop 104 based on the input received from the user.

In the example depicted, the web browser application window 108A includes multiple tabs—a first tab 112, a second tab 114, and a third tab 116. The first tab 112 is the active tab, and as a result, content according to the first tab 112 is displayed in the content area 111 of the web browser application window 108A. For instance, a web page of the first tab 112 may be displayed within the content area 111 of the web browser application window 108A. The tabs 114, 116 are referred to as open but inactive tabs. If a selection of the second tab 114 were to be received, content associated with the second tab 114 would be displayed within the content area 111 and the second tab 114 would become the active tab.

Figure 2A:
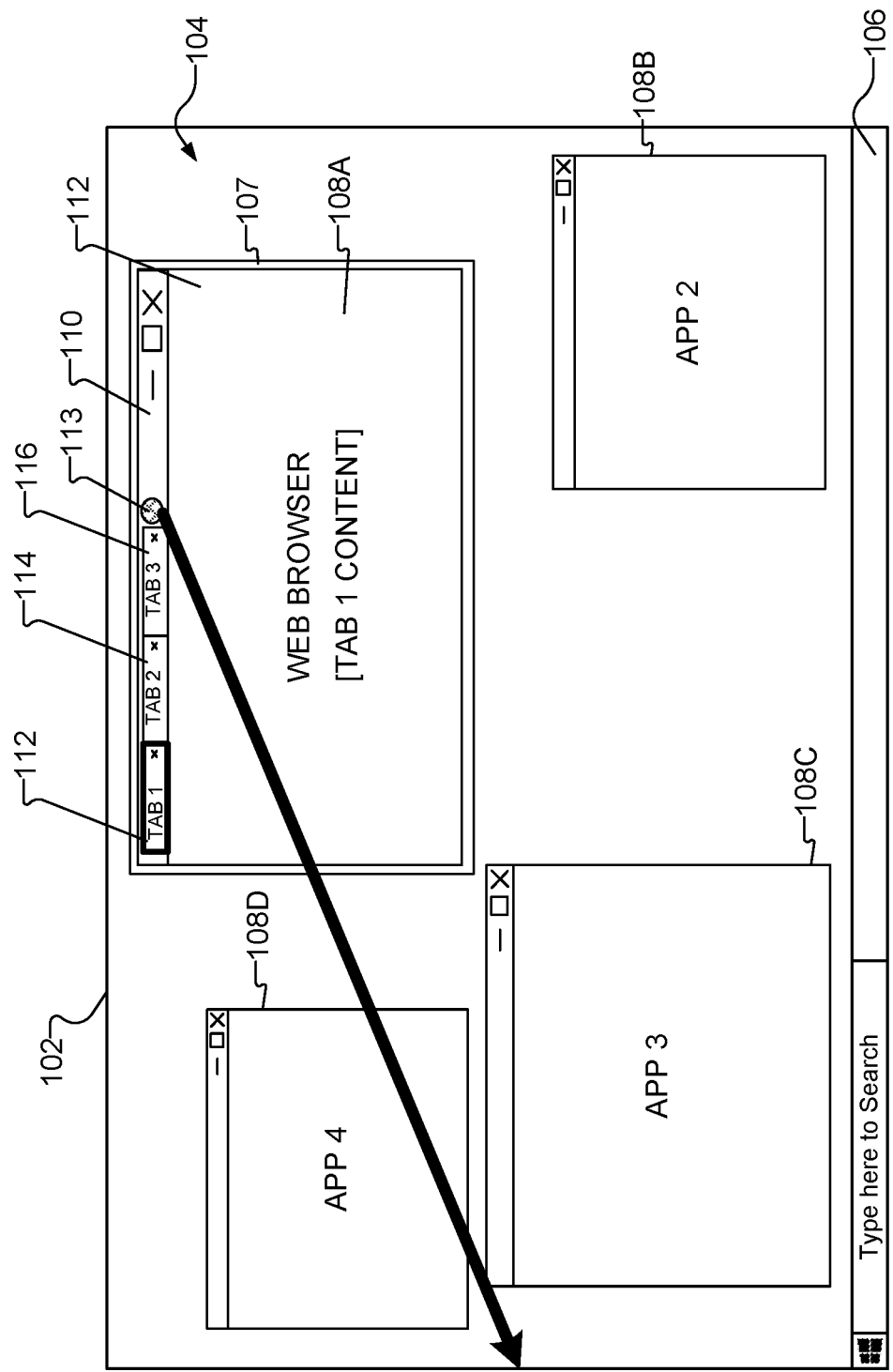
FIG. 2A depicts the example display with an input to move a particular application window to invoke a snap assist mode.

FIG. 2A depicts the example display with an input 113 to move the web browser application window 108A. In the example depicted, the input 113 is a touch input that is received through the touch-screen of the display 100. In other examples, however, the input 113 may be a selection from a cursor controlled by a mouse or other input device, such as a trackpad or similar device.

When the touch input 113 is received and held on the title bar 110, the web browser application window 108A may be dragged or moved around the desktop 104. When the drag operation is performed, a drag-indication border 107 may be displayed around the web browser application window 108A to provide a visual indication that the web browser application window 108A is the application window that has been selected for moving. The drag-indication border 107 may be an extended border displayed outside of the border of the particular application window 108 being dragged. The drag-indication border 107 may have different forms in other examples. For instance, the drag-indication border 107 may be displayed on fewer than all of the window edges, may provide a shadow effect, or may include another visual indicator or technique that indicates that the window has been selected for movement. In some examples, the drag-indication border 107 may only be displayed when the input 113 is a touch input. For instance, when the input 113 is a cursor input, the drag-indication border may not be displayed.

Figure 3A:
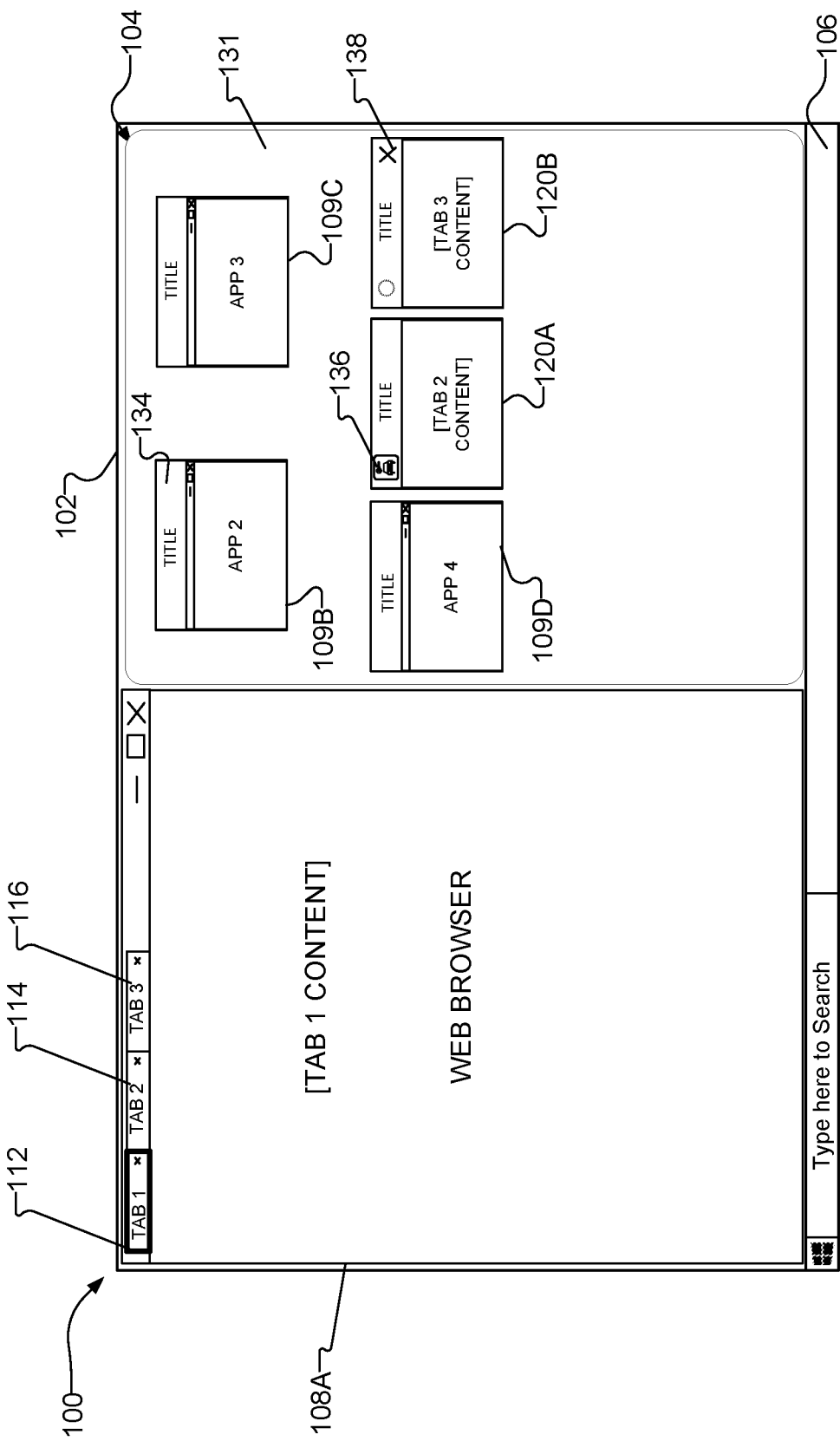
FIG. 3A depicts an example of the display with a snapped web browser application window and a pending-zone indicator with application-window representations and tab representations.
Figure 3B:
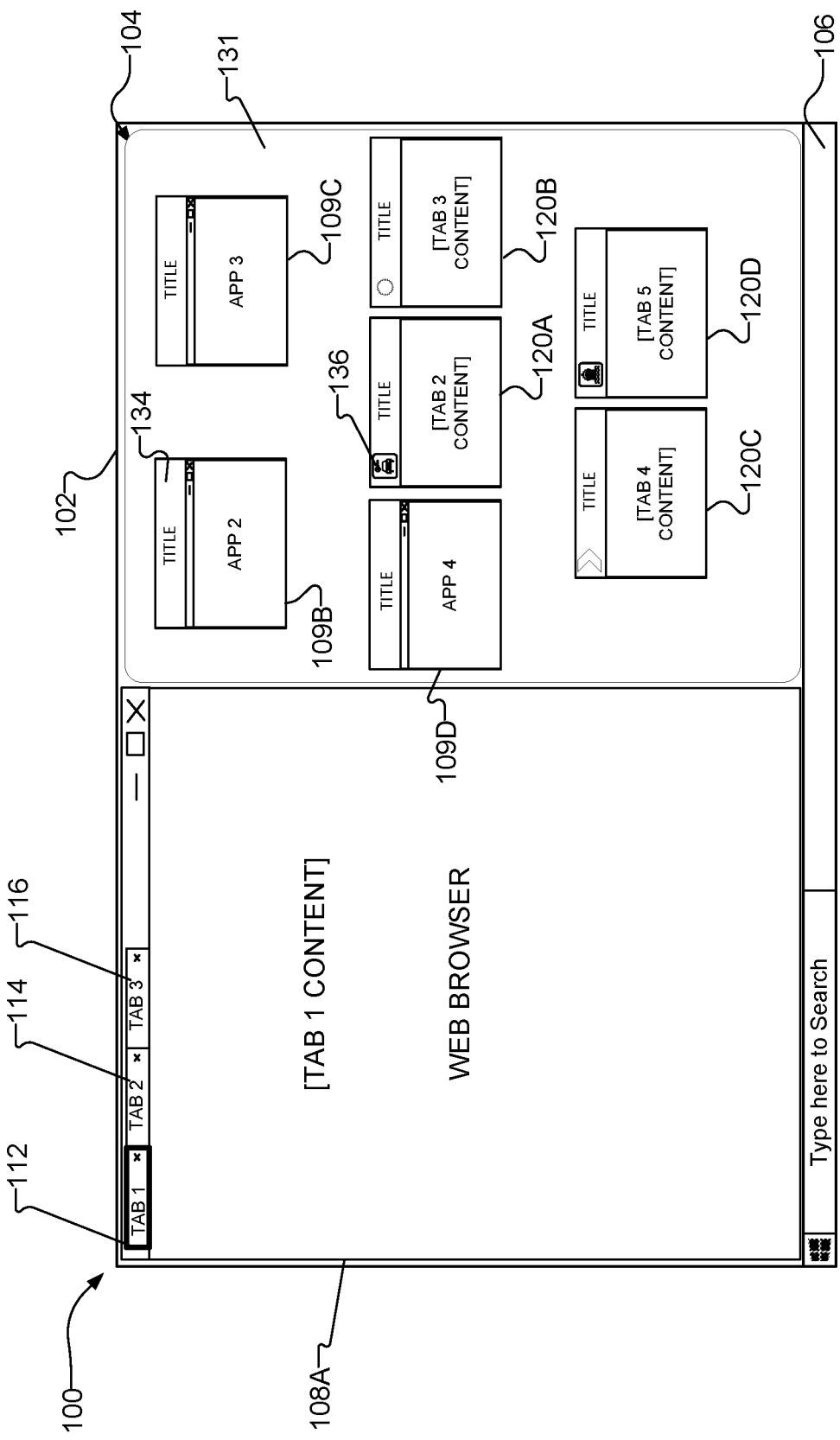
FIG. 3B depicts another example of the display with a snapped web browser application window and a pending-zone indicator with application-window representations and tab representations.

Once the touch input 113 is received, the web browser application window 108A may be dragged to a portion of the desktop 104 that invokes a snap assist mode of the operating system for positioning and arranging windows. Such positions may include edges of the desktop 104. In the example depicted, the web browser application window 108A is dragged to a left edge of the desktop 104, which causes the web browser application window 108A to be resized and repositioned (e.g., snapped) to fill the left half of the desktop 104, as shown in FIGS. 3A-3B.

Figure 2B:
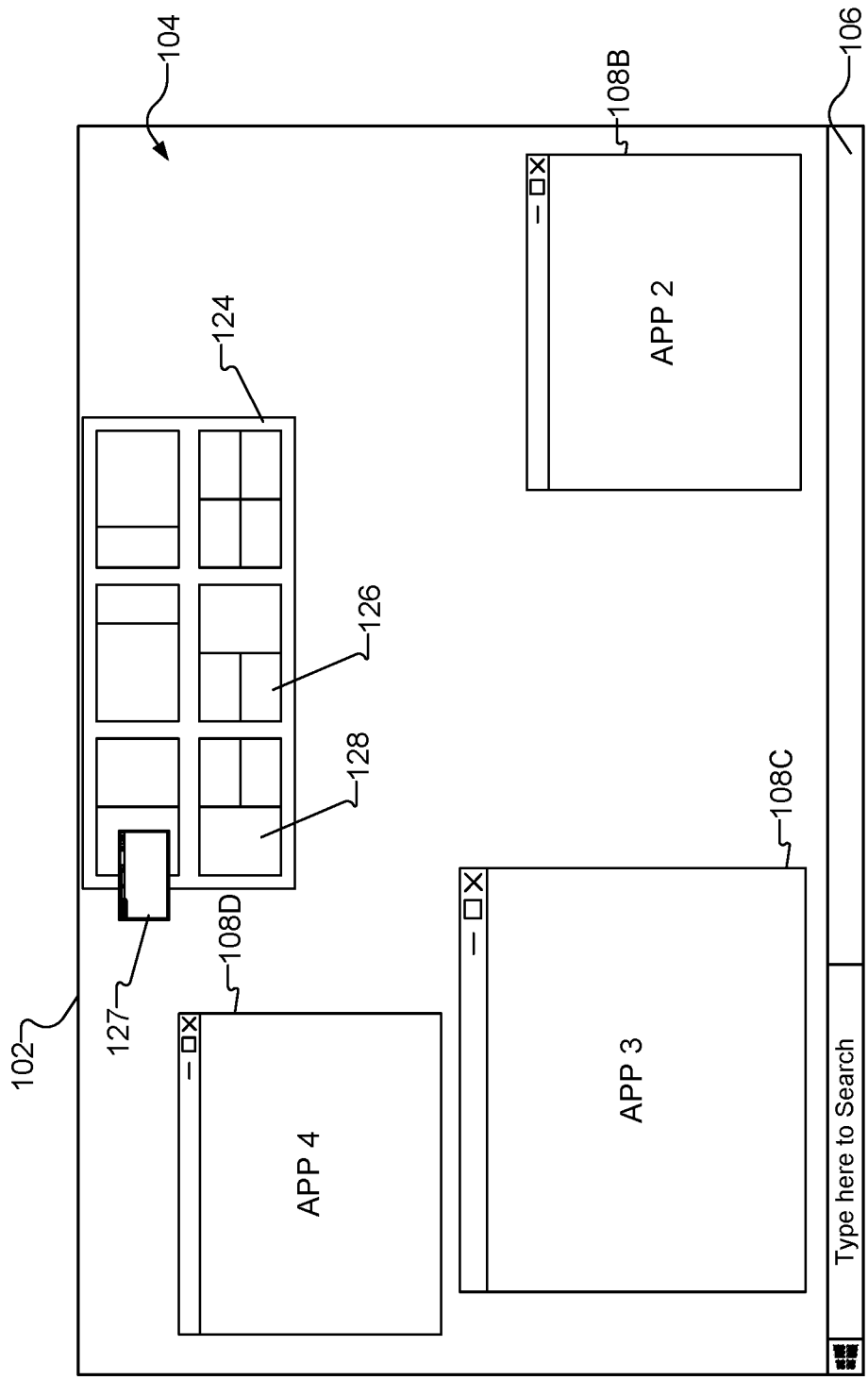
FIG. 2B depicts the example display with another input to invoke a snap assist mode.

FIG. 2B depicts the example display with another input to invoke a snap assist mode. In some examples, when the web browser application window 108A is dragged to an invocation region of the display screen (such as near a top border of the display), a layout menu 124 is displayed. The layout menu 124 includes a plurality of different display layouts 126. Each of the display layouts 126 includes a plurality of different snap zones 128 that correspond to different zones of the display. In addition to causing the display of the layout menu 124, dragging the web browser application window 108A into the invocation region may also cause the web browser application window 108A to shrink to a miniaturized representation 127 of the web browser application window 108A. The miniaturized representation 127 is easier to drag by the user and also allows for better selectivity of the different snap zones 128 of the display layouts 126. In addition, the miniaturized representation 127 occludes less of the layout menu 124 than the full web browser application window 108A.

The miniaturized representation 127 may be displayed in front of the layout menu 124. In turn, the layout menu 124 may be displayed in front from the remaining application windows 108, the desktop 104, and/or the taskbar 106 (where applicable). In some examples, the layout menu 124 may be displayed as a flyout from the border.

The snap zones 128 represent zones of the display for which different application windows may fill. The snap zones 128 for each different display layout 126 may vary in size, position, and number. The snap zones 128 for display layout 126 may also be configured such that when populated with application windows, the entire area of the display 100 and/or desktop 104 is filled or substantially filled (e.g., greater than 95% of the display area and/or desktop is occupied by application windows filling the snap zones). For instance, the area available for display of application windows (e.g., within the border 108 and above or interior to the taskbar 106) is substantially filled when populated with application windows. Accordingly, each of the display layouts 126 represent the display, and each of the snap zones 128 represent the size and position of an application window.

As an example, the first display layout 126 in the upper left corner or layout menu 124 includes two equally sized and spaced snap zones 128. Accordingly, if the first display layout 126 is selected, a first application window fills 50% of the display area and a second application windows fills the other 50% of the display area. As another example, the display layout 126 in the bottom left corner of the layout menu 124 includes three snap zones 128. A first snap zone 128 fills the entire height of the display area and 50% of the width of the display area. A second snap zone 128 fills 50% of the height of the display area and 50% of the width of the display area. The second snap zone 128 is positioned in the upper-right quadrant of the display area. A third snap zone 128 fills 50% of the height of the display and 50% of the width of the display area. The third snap zone 128 is positioned in the lower-right quadrant of the display area.

In some examples, multiple displays may be connected to the computing device and the desktop may extend across the multiple displays. In such examples, the display layouts 126 may be for a single display or for more than one of the multiple displays. For instance, a single display layout 126 may include snap zones that fill all the available displays over which the desktop extends.

When the miniaturized representation 127 is dropped (e.g., the touch input is released) over a particular snap zone 128, the particular display layout 126, in which the particular snap zone 128 is presented, is selected and the snap assist mode is invoked using the selected displayed layout 126. For instance, the miniaturized representation 127 may be dropped in the left snap zone 128 of the upper left display layout 126 to cause the web browser application window 108A to be snapped to the left half of the display 100 or desktop 104. FIG. 3A depicts an example of the display 100 with a snapped web browser application window 108A and a pending-zone indicator 131 with application-window representations 109 and tab representations 120. For example, once the web browser application window 108A is dragged to the left edge of the desktop 104 (or the snap assist mode is otherwise invoked), the web browser application window 108A is snapped to the left half of the desktop 104. Snapping the web browser application window 108A generally includes resizing and/or repositioning the web browser application window 108A into a predefined position or zone of the desktop 104. However, in some examples, the web browser application window 108A may already be positioned and sized in the snap position, and in such examples the window 108A may still be snapped to invoke the snap assist mode, but the size and position of window 108A may not change. Based on the web browser application window 108A being snapped into a position, a snap assist mode is invoked that assists in filling the remainder of the desktop 104 with additional application windows.

Invoking the snap assist mode causes a pending-zone indicator 131 to be displayed as an overlay of the desktop 104. The pending-zone indicator 131 indicates the portion or zone of the desktop 104 that a selected application window will fill. In the example depicted, the pending-zone indicator 131 indicates that a selected application window will fill the other half of the desktop 104. In other examples, the pending-zone indicator 131 may indicate that the selected application will fill a quarter of the desktop 104, such as a top or bottom quadrant of the desktop 104.

The pending-zone indicator 131 is a user interface element that fills or substantially fills the indicated or corresponding zone of the display or desktop. The pending-zone indicator 131 may be partially opaque, patterned, shaded, or otherwise designed to draw the user's attention to which zone will be filled. The corners of the pending-zone indicator 131 may be rounded in some examples. Where multiple pending-zone indicators 131 are displayed, the borders of the pending-zone indicators 131 may be spaced apart from one other so that each discrete pending-zone indicator 131 may be distinguished. Other configurations, sizes, and positions of the pending-zone indicator 131 may also be provided.

Selectable application-window representations 109 and selectable tab representations 120 are displayed within the pending-zone indicator 131. The application-window representations 109 are representations of the application windows 108 open 104 when the web browser application window 108A was snapped. For instance, in the example depicted, three application-window representations 109 are generated and displayed within the pending-zone indicator 131. More specifically, an application-window representation 109B corresponds to the second application window 108B, an application-window representation 109C corresponds to the third application window 108C, and an application-window representation 109D corresponds to the fourth application window 108D.

The application-window representations 109 include an image of the corresponding application window 108. The image of the corresponding application window 108 may include a capture of the application window 108 in the current state of the particular application window 108. The application-window representations 109 may include a preview or image of the content that is being displayed in the content area 111 of the particular application window 108 as well as the title bar 110 or other border features of the particular application window 108.

The tab representations 120 correspond to tabs that are open in web browser application windows when the snap assist mode is invoked. In the example depicted, only one web browser application window 108A was open when the snap assist mode was invoked. The web browser application window 108A has three tabs open, the first tab 112, the second tab 114, and the third tab 116. Because the first tab 112 is the active tab and the web browser application window 108A was the application window 108 that was snapped to invoke the snap assist mode, tab representations 120 are generated only for the second tab 114 and the third tab 116 (i.e., the inactive tabs). For instance, a tab representation 120 is generated for the second tab 114 and another tab representation 120B is generated for the third tab 116.

Unlike the application-window representations 109, the tab representations 120 may require additional processing and rendering because the content of the inactive tabs are not currently displayed when the snap assist mode is invoked. Accordingly, generating the application-window representations 109 may include receiving rendering or graphical data from the web browser application such that a preview or graphical representation of the content of the corresponding tab can be generated and used in the tab representations 120. The content displayed within the tab representations 120 may also be different from that of the application-window representations 109, to distinguish web browser tabs from other application windows. For instance, in some examples, only the content of the web page or web resource of the corresponding tab may be displayed in the tab representations 120, unlike the application-window representations 109 which also includes additional application window features, such as the title bar 110 and borders of the corresponding application window 108. By not including the additional application window features, the user is able to more easily visually distinguish the tab representations 120 from the application-window representations 109. In other examples, however, the tab representations may include an indicator or indicia that the corresponding tab is associated with a particular web browser or application.

The application-window representations 109 and the tab representations 120 may also include a window title segment 134. The window title segment 134 displays the title of the corresponding application window 108. The title of the application window 108 may be a title of the document open in the application window 108, a web page title open in the application window 108, etc. For the tab representations 120, the window title segment 134 displays the name of the web page or the web resource of the corresponding tab rather than the name of the application (e.g., the web browser name). Otherwise, each of the tab representations 120 would display the same application name, which would be less helpful in identifying the desired tab.

In some examples, the window title segment 134 also includes an icon or graphical indicator 136 for the corresponding application or web page. For the tab representations 120, the graphical indicator 136 may be an icon or indicator for the web page, such as a favicon, rather than an icon for the web browser. Accordingly, the tab representations 120 may be more easily distinguished from one another via the graphical indicators in the window title segment 134 as well as the text.

In some examples, the window title segment 134 also includes a selectable close element 138. The selectable close element 138 may be persistently displayed or displayed when an interaction with the tab representation is detected. For instance, upon detecting a hover interaction with a tab representation 120, the selectable close element 138 may be displayed. Upon receiving a selection of the close element 138, the corresponding tab is closed in the web browser application window in which the tab was open. As an example, if the selectable close element 138 for the tab representation 120B is selected, the third tab 116 is closed in the web browser application window 108A and the tab representation 120B is removed from the display. Closing of the third tab 116 may be caused by sending a signal or instructions to the web browser with the tab identifier for the third tab 116 and an indication to close the third tab 116.

FIG. 3B depicts another example of the display 100 with snapped web browser application window 108A and a pending zone indicator 131 with application-window representations 109 and tab representations 120. FIG. 3B is similar to FIG. 3A with the exception that the pending-zone indicator 131 in FIG. 3B includes two additional tab representations 120C-D. The tab representations 120C-D correspond to tabs that are not currently open in any web browser(s), but are tabs that are frequently used and/or recently closed. For example, the operating system and/or web browsers may track the frequency with which tabs are being opened and/or activated. From that frequency data, a list of most-frequently-used (MFU) tabs and most-recently-used (MRU) tabs may be maintained. Tab representations 120 for one or more of the MFU tabs and/or MRU tabs may generated even where those tabs are not currently open within a web browser when the snap assist mode is invoked.

In some examples, tab representations 120 may be generated for the MFU tabs and/or the MRU tabs when the number of tabs currently open in web browsers (referred to as open tabs) is below a threshold number of tabs, such as 5 or 10 tabs. The threshold number of tabs may be a configurable setting that is adjustable by the user. The number of tab representations 120 that are generated for the MFU tabs and/or MRU tabs may be the difference between the open tabs and the threshold number of tabs. For instance, in the example depicted in FIG. 3B, the number of open tabs is three and the threshold number of tabs is 5. As a result, two additional tab representations 120C-D are generated. Accordingly, the total number of tab representations 120 provided in the pending-zone indicator 131 is equal to the threshold number of tabs. In some examples, tab representation(s) 120 for one or more closed MFU tabs and/or MRU tabs may be displayed instead of, or ahead of, one or more inactive tabs. For instance, while inactive tabs may be present in an open web browser application window, those tabs may have been inactive for quite some time or used less frequently than some of the MFU tabs and/or the MRU tabs.

The application-window representations 109 and/or tab representations 120 may also be organized based how recently the tab was activated or used. For instance, the application-window representations 109 and/or tab representations 120 may be organized from the top-most, left-most position representing the most recently used application window or tab.

In some examples, more application-window representations 109 and/or tab representations 120 are generated that can be displayed in a single pending-zone indicator 131. In such examples, the area of the pending-zone indicator 131 that includes the application-window representations 109 and/or the tab representations 120 may be scrollable or paginated such that the additional application-window representations 109 and/or tab representations 120 may be brought into view via user interaction with a scroll bar and/or pagination elements.

Figure 4:
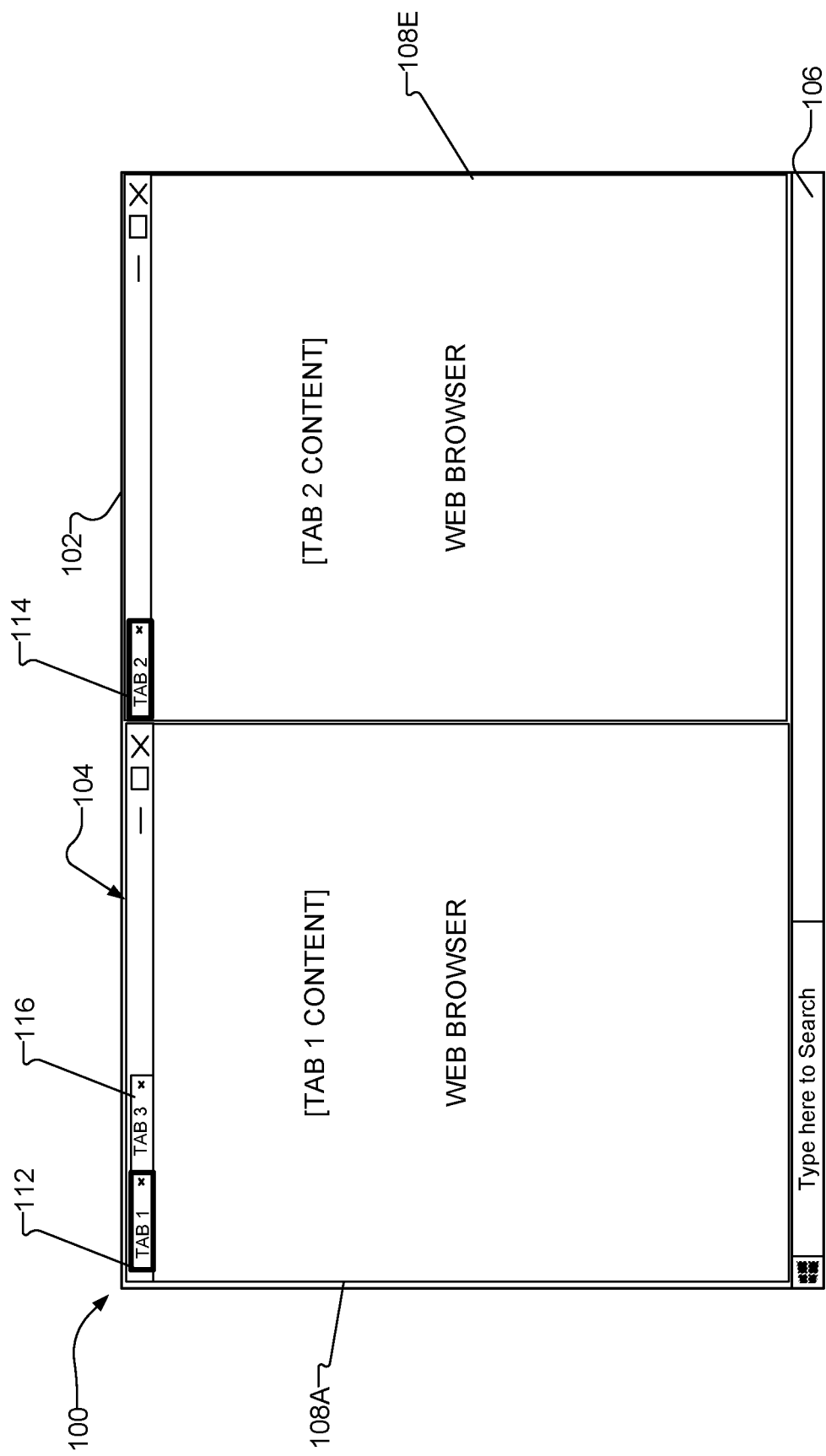
FIG. 4 depicts an example of the display with the pending-zone indicator filled with a selected tab.

Upon receiving a selection of one of the application-window representations 109 or tab representations 120, the zone corresponding to the pending-zone indicator 131 is filled with the corresponding particular application window 108 or tab. When a tab representation 120 is selected, a new instance or host of the web browser application is generated to host the selected tab. For example, when the tab representation 120A corresponding to the second tab 114 is selected, a new web browser application window 108 corresponding to a new instance or host of the web browser is created to host the second tab 114, as shown in FIG. 4.

Figure 3C:
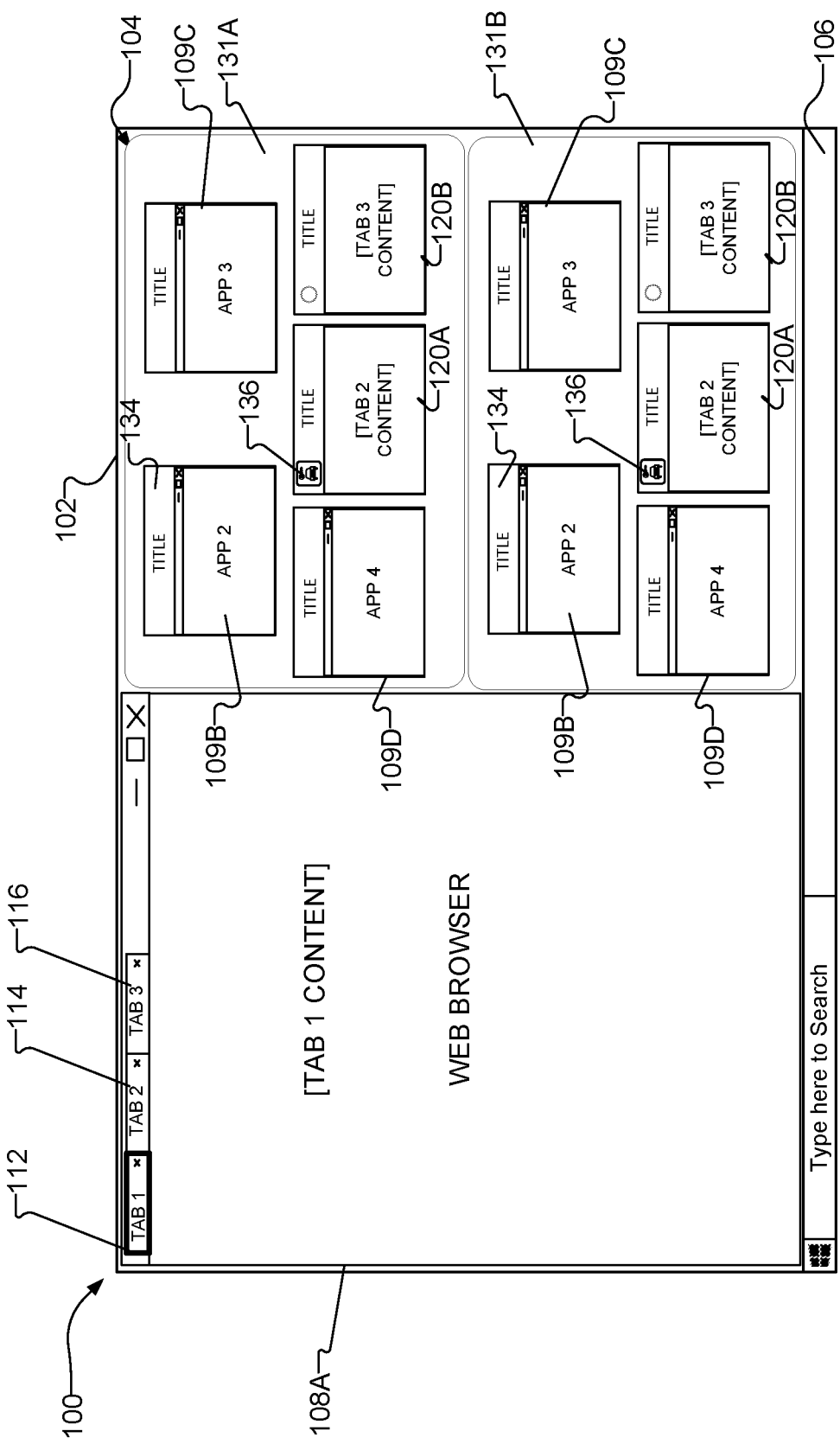
FIG. 3C depicts another example of the display with a snapped web browser application window and multiple pending-zone indicators with application-window representations and tab representations.

FIG. 3C depicts another example of the display 100 with a snapped web browser application window 108A and multiple pending-zone indicators 131 with application-window representations 109 and tab representations 120. In the example depicted in FIG. 3C, a different snap layout 126 is used than in the example in FIG. 3B. For instance, the snap layout 126 used for FIG. 3B includes three snap zones 128. Accordingly, when the web browser application window 108A is snapped to the first snap zone corresponding to the left half of the display 100, two pending-zone indicators 131 are displayed to indicate the two remaining snap zones 128 to be filled. More specifically, a first pending-zone indicator 131A and a second pending-zone indicator 131B are displayed. The first pending-zone indicator 131A corresponds to the upper-right quadrant of the display 100, and the second pending-zone indicator 131B corresponds to the lower-right quadrant of the display 100.

In the example depicted, both the first pending-zone indicator 131A and the second pending-zone indicator 131B are populated with the application-window representations 109 and the tab representations 120. The application-window representations 109 and the tab representations 120 shown in FIG. 3B are the same as the application-window representations 109 and the tab representations 120 shown in FIG. 3A. When an application-window representation 109 or a tab representation 120 is selected, the corresponding application window fills the zone corresponding to the pending-zone indicator 131. The selected application-window representation 109 or tab representation 120 is then removed from the remaining pending zone indicators 131. For instance, if the application-window representation 109B were to be selected from the first pending-zone indicator 131A, the second application window 108B populates the zone corresponding to the first pending-zone indicator 131A (e.g., the upper-right quadrant). The application-window representation 109B is then removed from display in the second pending-zone indicator 131B. Selection of one of the remaining application-window representations 109 or tab representations 120 in the second pending-zone indicator 131B causes the corresponding application window to fill the zone corresponding to the second pending-zone indicator 131B (e.g., the lower-right quadrant).

In other examples, only one of the pending-zone indicators 131 may be populated with the application-window representations 109 and the tab representations 120 at a time. For example, when the snap-assist mode is invoked, the first pending-zone indicator 131A may be populated but not the second pending-zone indicator 131B. When one of the with the application-window representations 109 or the tab representations 120 is selected to fill the zone of the first pending-zone indicator 131A, the second pending-zone indicator 131B may then be filled with the remaining application-window representations 109 and tab representations 120.

FIG. 4 depicts an example of the display with the zone corresponding to the pending-zone indicator 131 filled with a new web browser application window 108E that hosts the selected second tab 114. In response to receiving a selection of the tab representation 120A, the new web browser application window 108E is generated and displayed. The new web browser application window 108E is sized and positioned to fill the zone corresponding to the pending-zone indicator 131. Positioning and sizing the new web browser application window 108E at launch also differs from the usual application launches where the applications may have controlled the initial sizing and positioning the corresponding application window(s) upon launch. With the present technology, newly created application windows can be snapped upon launch of the application windows. Sizing and positioning the new web browser application window 108E may be animated as if the window was already opened. For instance, an animated growth from the tab representation 120A to the new web browser application window 108E may be displayed.

Because the second tab 114 was open in the web browser application window 108A when the snap assist mode was invoked and the tab representation 120A was selected, the second tab 114 may be removed from the web browser application window 108A when the second tab 114 is opened or hosted in the second or new web browser application window 108E. Transferring the second tab 114 from the web browser application window 108A to the new web browser application window 108E may also include transferring the state data of the second tab 114 to the new web browser application window 108E. Thus, the web page of the second tab 114 may be viewed in the new web browser application window 108E in the same state that the web page was in when the second tab 114 was inactivated in the web browser application window 108A. In some examples, this transferring of tabs from one web browser application window to a new web browser application window may be referred to as "tearing out" a tab from the web browser application window.

In other examples, however, the second tab 114 may not be removed from the web browser application window 108A. Instead, the second tab 114 remains within the web browser application window 108A and a duplicate of the second tab 114 is created in the new web browser application window 108E. Whether a duplicate tab is created or the tab is removed from the web browser application window 108A may be controlled via a user-adjustable setting of the snap assist mode.

As another example, if one the tab representations 120 corresponding to a closed tab (e.g., tab representations 120C-D) is selected, the new web browser application window 108E is still generated to host the tab corresponding to the selected tab representations 120. Because the corresponding tab is not open in any web browser(s), however, there is no need to remove the tab from any other web browser(s). Accordingly, the web address for the selected tab may be loaded upon creation of the new web browser application window 108E as the tab is not transferred from another web browser application window.

Figure 5:
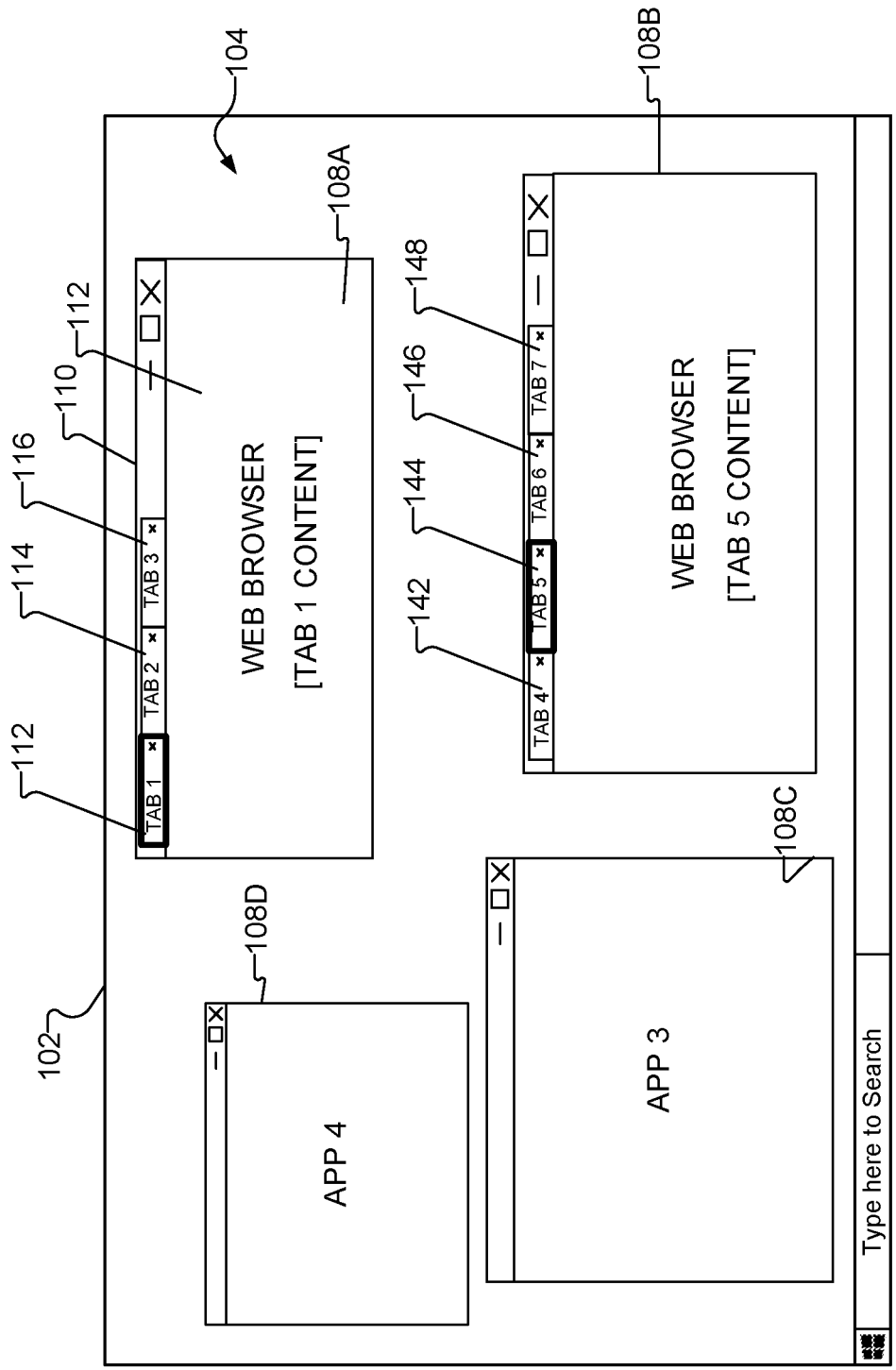
FIG. 5 depicts another example display with a plurality of application windows.

FIG. 5 depicts another example display 100 with a plurality of application windows 108. FIG. 5 depicts an example that is substantially similar to the example depicted in FIG. 1 with the exception that the second application window 108B is a second web browser application window. Accordingly, the desktop 104 includes a first web browser application window 108A and a second web browser application window 108B. The first web browser application window 108A includes the first tab 112, the second tab 114, and the third tab 116. The first tab 112 is the active tab and content for the first tab 112 is displayed in the content area 111 of the web browser application window 108A.

The second web browser application window 108B also has multiple open tabs, including a fourth tab 142, a fifth tab 144, a sixth tab 146, and a seventh tab 148. The fifth tab 144 is the active tab. Thus, the content of the fifth tab 144 is displayed in the content area 111 of the second web browser application window 108B.

Figure 6:
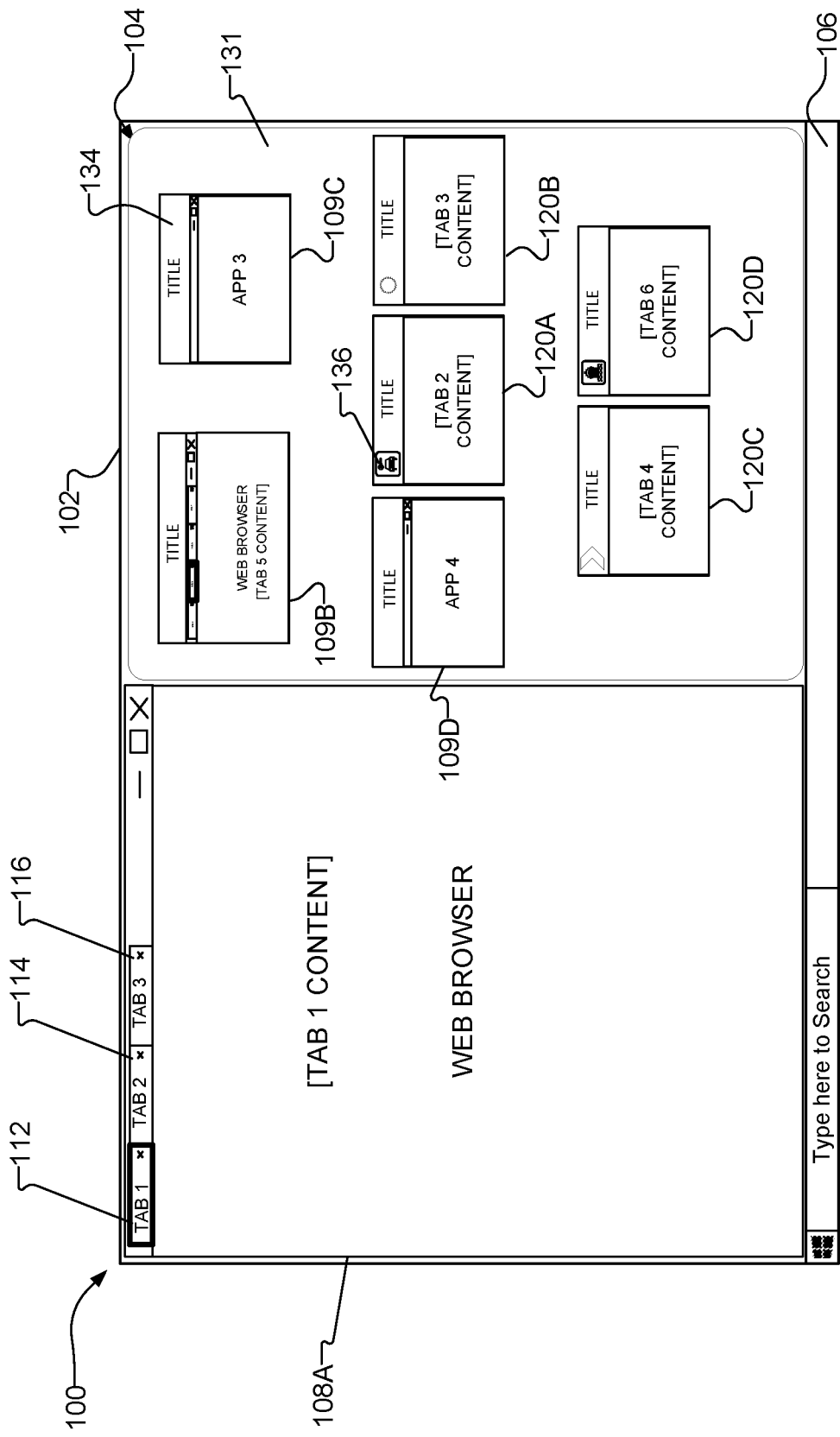
FIG. 6 depicts another example of the display with a snapped web browser application window and a pending-zone indicator with application-window representations and tab representations.

As with the example in FIGS. 1-2, the web browser application window 108A may be dragged to the left edge of the desktop 104 to invoke the snap assist mode and snap the web browser application window 108A to the left half of the desktop 104, which is shown in FIG. 6.

FIG. 6 depicts another example of the display 100 with a snapped web browser application window 108A and a pending-zone indicator 131 with application-window representations 109 and tab representations 120. The application-window representations 109 include an application-window representation 109B corresponding to the second web browser application window 108B, an application-window representation 109C corresponding to the third application window 108C, and an application-window representation 109D corresponding to the third application window 108C.

The tab representations 120 include a tab representation 120A corresponding to the second tab 114 and a tab representation 120B corresponding to the third tab 116. In addition, a tab representation 120C corresponding to the fourth tab 142 and a tab representation 120D corresponding to the sixth tab 146. Of note, there is no separate tab representation corresponding to the fifth tab 144. The omission of such a tab representation is due to the content of the fifth tab 144 being shown in the application-window representation 109B corresponding to the second web browser application window 108B. The content of the fifth tab 144 is shown in the application-window representation 109B because the fifth tab 144 is the active tab in the second web browser application window 108B. As such, there is no need to create a duplicate preview of the fifth tab 144 content via another tab representation, which allows for additional or different tab representations to be displayed in the pending-zone indicator 131. Such duplicate previews would also waste display space and processing resources.

Also of note, there is no tab representation corresponding to the seventh tab 148. No tab representation is generated for the seventh tab 148 in this example due to a threshold number of tab previews or representations. In this example, the threshold number of tab previews may be five. In the pending-zone indicator 131, five tab previews are shown in the combination of the tab representations 120 and the application-window preview of the second web browser application window 108B.

The determination of the tabs for which to generate tab representations 120 may be based on a set of heuristics or factors. For instance, the first five open tabs in the MitU list and/or the MFU tabs list may be selected for generation of the tab representations 120 up to the threshold number of tab previews. In other examples, tabs that are most frequently selected for display in combination with the application was associated with the originally snapped application window 108A and/or web resource associated with the displayed tab 112 may be used for prioritizing the tabs for which tab representations 120 are generated. For instance, a user may frequently select a particular tab or tabs when snapping the web browser application window 108A. Those tabs are then given priority for generation of the tab representations 120. Accordingly, the criteria or heuristics for prioritization of tabs for which tab representations 120 are generated may be user and context specific.

Figure 7:
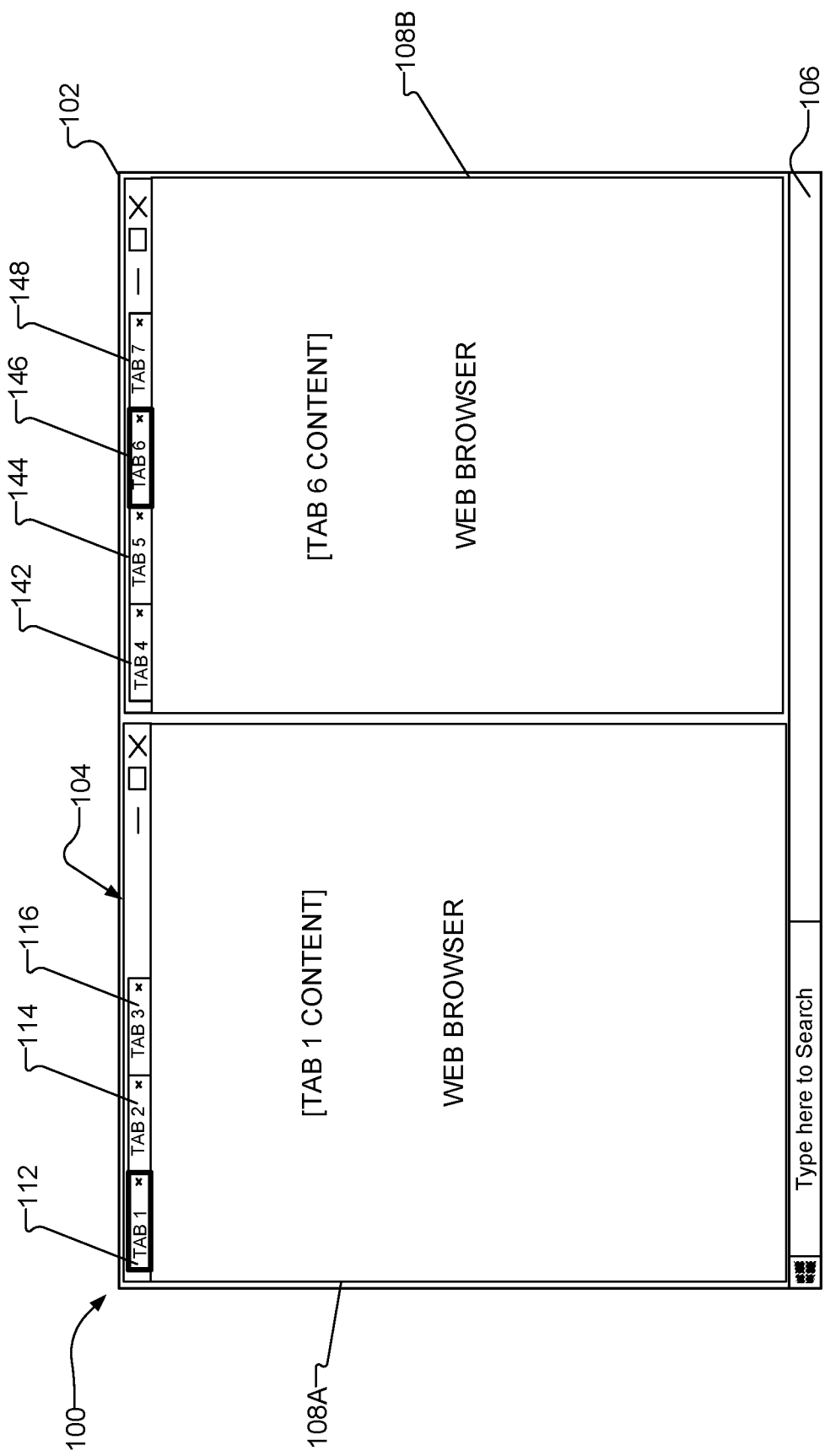
FIG. 7 depicts an example of the display with the zone of the pending-zone indicator filled with a selected tab.

When one of the application-window representations 109 or the tab representations 120 are selected, the corresponding application window or tab is snapped (e.g., resized and repositioned) to fill the pending-zone indicator 131. If a tab representation 120 for an inactive tab from the second web browser application window 108B is selected, the second web browser application window 108B is snapped into the position of the pending-zone indicator 131 and the tab is activated. As an example, the tab representation 120D corresponding to the sixth tab 146 may be selected. When that tab representation 120D is selected, the second web browser application window 108B is resized and repositioned to fill the pending-zone indicator 131, as shown in FIG. 7. In addition, the sixth tab 146 is changed to the active tab in the second web browser application window 108B.

In other examples, selection of the tab representation 120D causes a new web browser application window to be launched rather than opening the second web browser application window 108B. Whether the original web browser application window hosting the inactive tab or a new web browser application window is used may be a configurable setting of the snap assist mode that may be changed by the user.

Figure 8A:
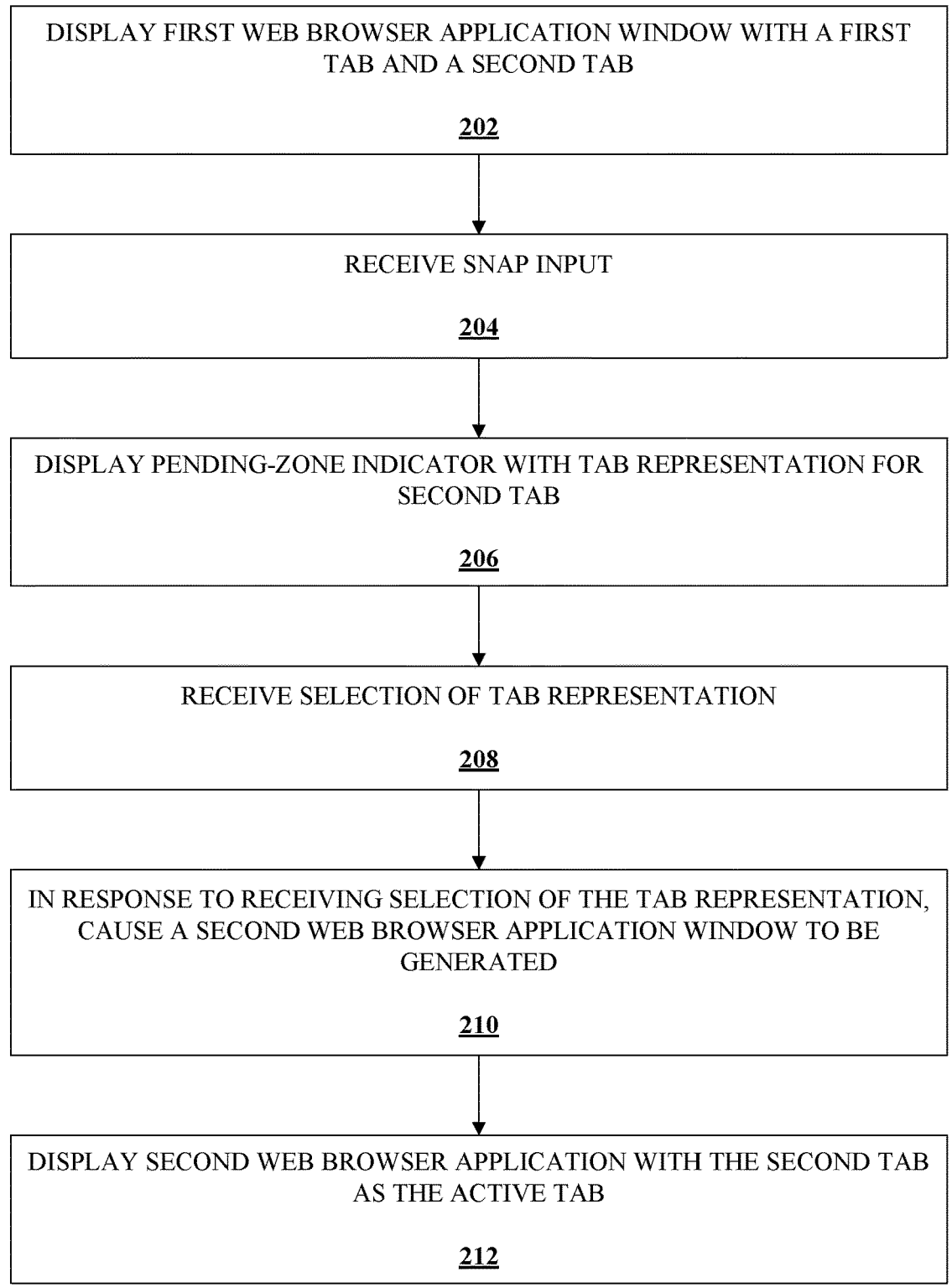
FIG. 8A depicts an example method for arranging windows having tabbed user interface elements.

FIG. 8A depicts an example method 200 for arranging windows having tabbed user interface elements. The operations of method 200 may be performed by a client device and, in some examples, by the operating system or a feature thereof. At operation 202, a first web browser application window is displayed on the display, such as on the desktop of the display. The first web browser application window may be one of a plurality of application windows that are displayed on the display. The first web browser application window has multiple tabs open including at least a first tab and a second tab. In the present example, the first tab is the active tab and the second tab is the inactive tab.

At operation 204, an input is received that causes the first web browser application window to snap into a particular position. Snapping the web browser application window may include resizing and/or repositioning the web browser application window to a predefined position and size. The input may include a drag input to drag the web browser application window to one of the borders of the display or desktop. Other inputs may include, while the first web browser application window is the active window, a keyboard input (e.g., CTRL-k) or an input from a selection device, such as pointer (e.g., mouse) or touch input (e.g., pen, stylus, or finger). In other examples, the input may include voice input that indicates where the first web browser application window should be snapped.

At operation 206, in response to the input to snap the first web browser application window into position, a pending-zone indicator is generated and displayed. The pending-zone indicator includes at least one tab representation for the second tab, which is the inactive tab of the first web browser application window in this example. Additional tab representations may also be generated for additional inactive tabs of the first web browser application window and/or inactive tabs of other open web browser application windows. Some of the tab representations may also be generated for closed tabs, as discussed above. In some examples, application-window representations may also be generated where there are additional application windows open when the input to snap the first web browser application window is received.

The tab representations may be generated for tab identifiers that are received from the web browser application. For instance, the web browser application may communicate or transmit tab identifiers for each of the open tabs. The tab identifier may include a unique identifier for the particular tab. Along with the tab identifier, the web browser application may also transmit additional data that is displayed in the tab representations. For instance, the additional data may include the title of the web page for the tab, the favicon for the website, and/or a graphical representation of the web page (e.g., an image of the web page, a live view of the web page). For example, because the operating system may not have access to images of the content of inactive tabs, the web browser sends those images to the operating system to be included within the corresponding tab representations 120. The tab identifier and the additional data is then received by the operating system or feature providing the snap assist mode to generate the corresponding tab representations.

At operation 208, a selection of the tab representation corresponding to the second tab of the first web browser application window (e.g., the inactive tab) is received. The selection may be made via touch input, pointer selection, voice input, or other types of suitable input.

In response to receiving the selection of the tab representation, at operation 210, a second web browser application window is caused to be generated to host to the second tab. At operation 212, the second web browser application window is displayed with the second tab as the active tab. For instance, the operating system or feature executing the snap assist mode, generates and transmits a signal to the web browser application to cause the web browser application to launch or generate a new host of the web browser application as the second web browser application window. The transmitted signal may include a tab identifier for the second tab, which may be the same tab identifier that was received in generating the tab representation. In addition to causing the second web browser application window to be displayed with the second tab, operation 210 may also cause the second tab to be removed from the first web browser application window.

Figure 8B:
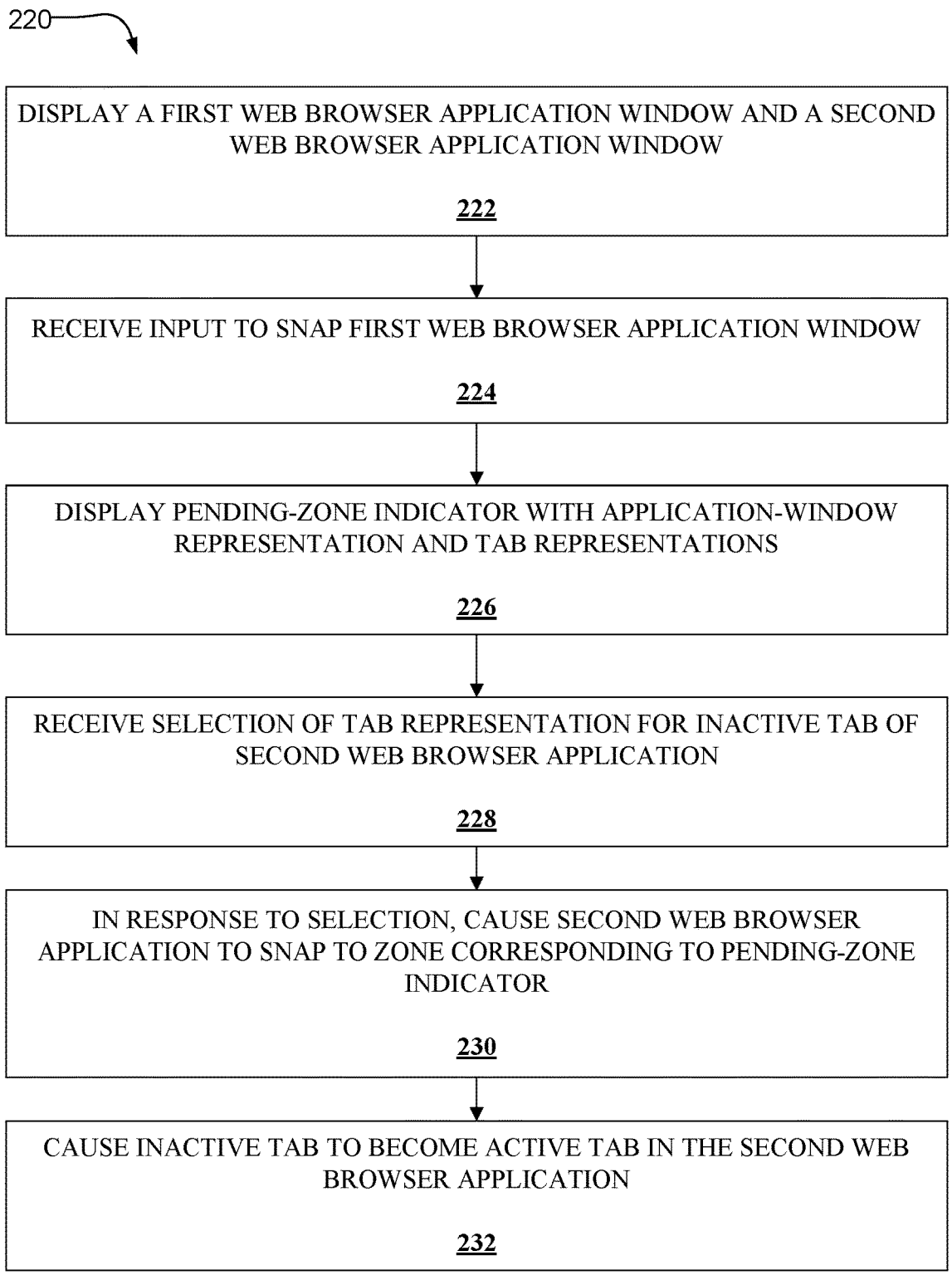
FIG. 8B depicts an example method for arranging windows having tabbed user interface elements.

FIG. 8B depicts an example method 220 for arranging windows having tabbed user interface elements. The operations of method 220 may be performed by a client device and, in some examples, by the operating system or a feature thereof.

At operation 222, a first web browser application and a second web browser application are displayed on a display within a desktop. The first web browser application window includes at least a first open tab and a second open tab. The first tab is the active tab in the first web browser application window. The second web browser application window includes at least third open tab and a fourth open tab. The third tab is the active tab in the second web browser application window.

At operation 224, an input is received to cause the first web browser application window to be snapped to a position. The input to snap the first web browser application window may include the types of inputs discussed above. The first web browser application window is then resized and/or repositioned in the predetermined snap position. In addition, a snap assist mode is invoked a pending-zone indicator is displayed at operation 226.

The pending-zone indicator includes an application window representation for the second web browser application window. The application-window representation includes a preview or image of the content for the third tab because the third tab is the active tab in the second web browser application window. The pending-zone indicator also includes a first tab representation for the second tab and a second tab representation for the fourth tab.

At operation 228, a selection of the second tab representation for the fourth tab, which is an inactive tab in the second web browser application window, is received. The selection may be received in any of the forms discussed above. In response to receiving the selection of the second tab representation, the operating system or snap assist feature causes the second web browser application window to be resized and repositioned to fill the zone corresponding to the pending-zone indicator at operation 230. For instance, the second web browser application window is snapped to the position and size of the pending-zone indicator. In addition, the operating system or snap assist feature cause the fourth tab to become the active tab in the second web browser application window at operation 232.

Figure 9:
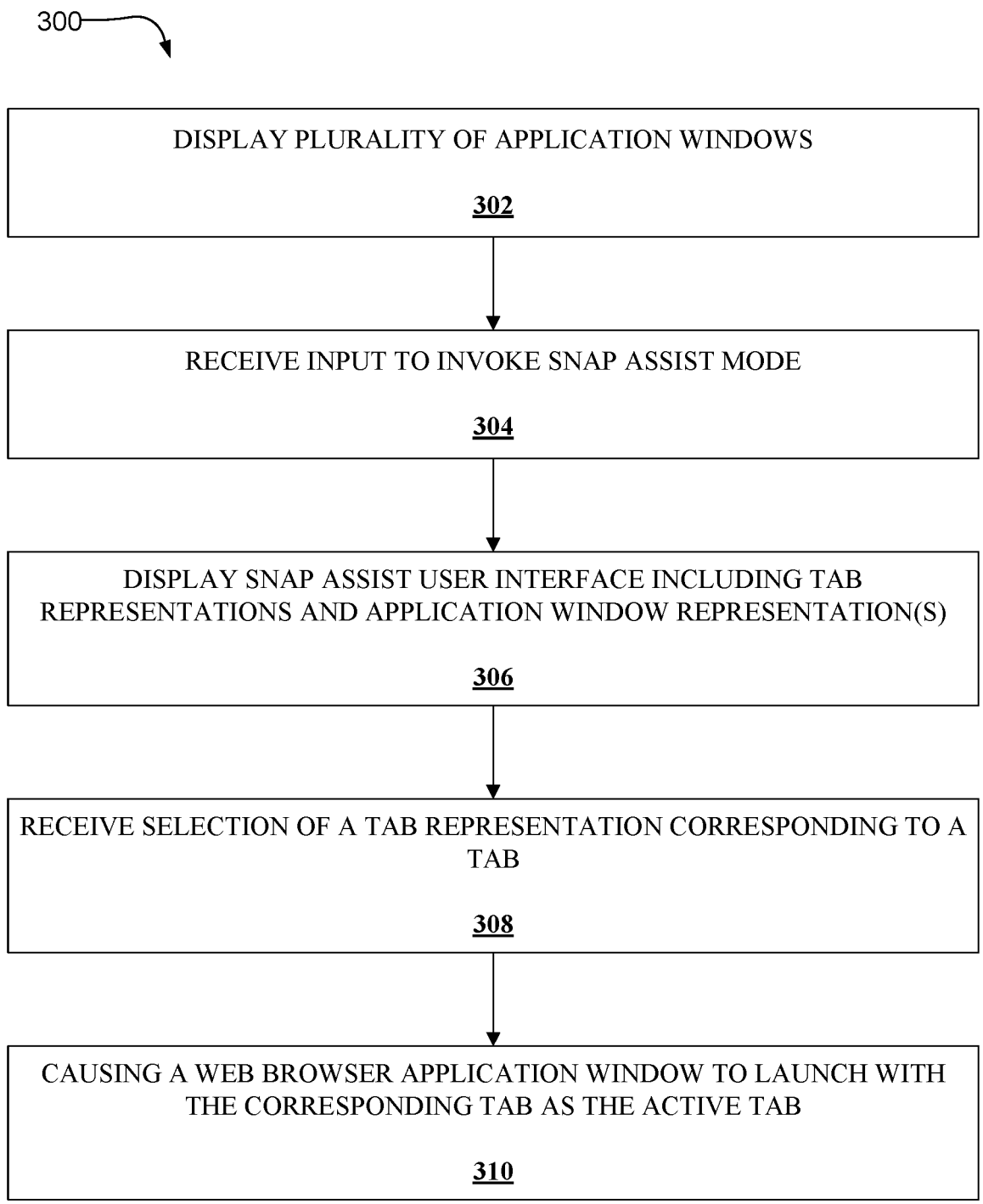
FIG. 9 depicts an example method for arranging windows having tabbed user interface elements.

FIG. 9 depicts an example method 300 for arranging windows having tabbed user interface elements. The operations of method 300 may be performed by a client device and, in some examples, by the operating system or a feature thereof.

At operation 302, a plurality of application windows are displayed on a display. the application windows may include at least one application window for a web browser that has multiple open tabs. The open tabs may be open across different web browser application windows. The open tabs have at least one active tab and multiple inactive tabs.

At operation 304, an input is received to invoke a snap assist mode. Such an input may include the inputs discussed above, such as a dragging input, a keyboard input, a touch input, a voice input, etc. In response to receiving the input, the snap assist mode is invoked and a snap assist user interface is displayed in operation 306.

The snap assist user interface includes tab representations for at least two of the inactive tabs. The snap user interface also includes at least one application-window representation for at least one of the plurality of application windows displayed in operation 302.

At operation 308, a selection of a tab representation corresponding to an inactive tab is received. The selection may be received in any of the manners discussed above.

At operation 310, based on receiving the selection of the tab representation, a web browser application window is caused to be displayed. The web browser application window is displayed with the tab corresponding to the tab representation as the active tab. The present technology may determine whether to open a new host or instance of the web browser to display the tab or display an already launched web browser application window. For instance, if the tab corresponding to the selected tab representation is open in a web browser application window that has already been snapped, then a new web browser application window is launched. If the tab corresponding to the selected tab representation is open in a web browser application window that has not already been snapped, that web browser application window is displayed with the tab corresponding to the selected tab representation as the active tab.

While the above discussion has primarily focused on tabs of web browsers, the present technology may apply or be used with other applications that provided tabbed organization of content or tabbed user interface elements. For instance, additional pages or resources may be organized as tabs within a single application window. Tab representations may be generated for those tabs and utilized in a similar manner as discussed above with respect to web browsers.

Figure 10:
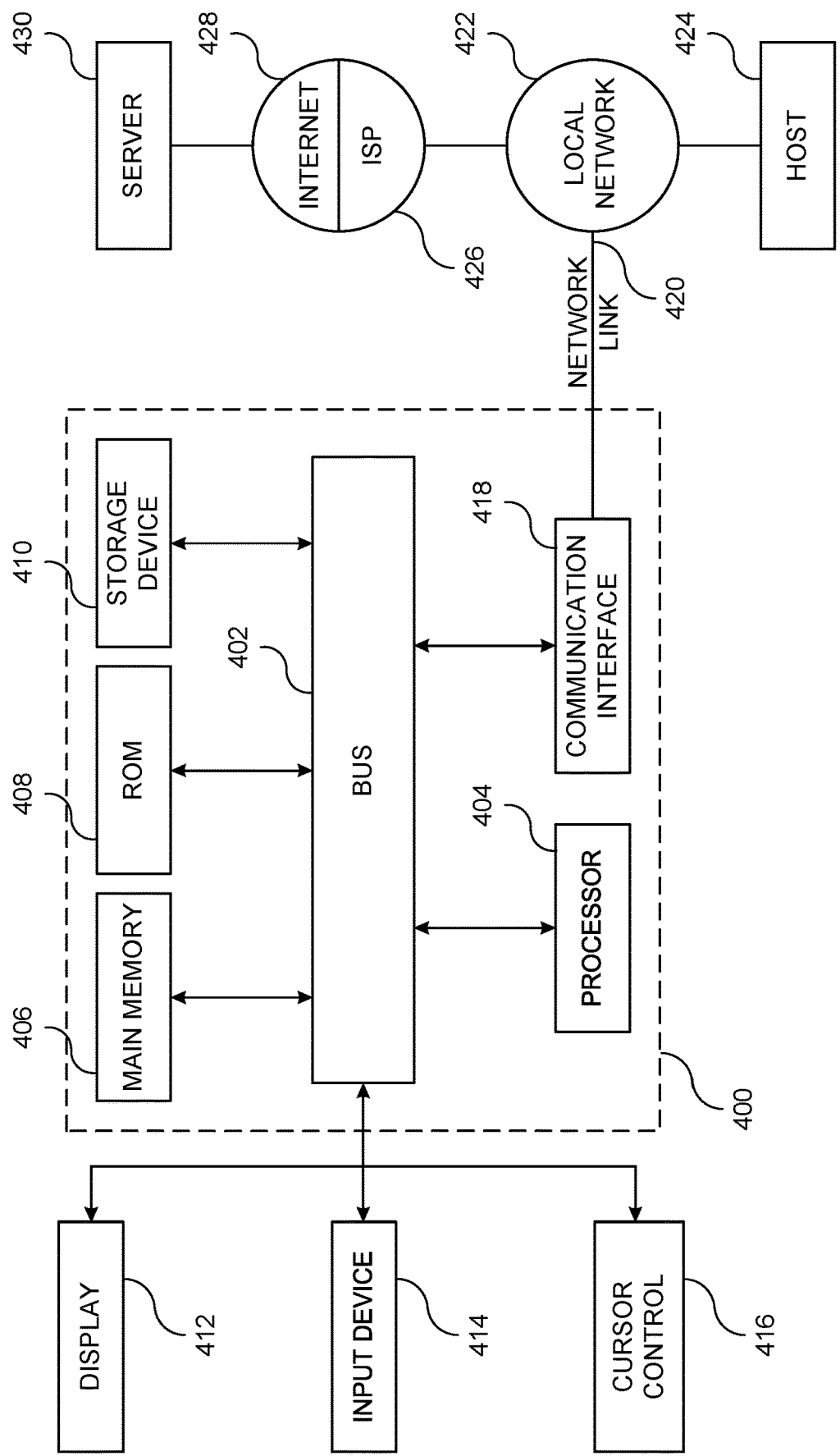
FIG. 10 depicts a block diagram showing an example computer system upon which implementations of this disclosure may be implemented

FIG. 10 is a block diagram showing an example a computer system 400 upon which aspects of this disclosure may be implemented. The computer system 400 may include a bus 402 or other communication mechanism for communicating information, and a processor 404 coupled with the bus 402 for processing information. The computer system 400 may also include a main memory 406, such as a random-access memory (RAM) or other dynamic storage device, coupled to the bus 402 for storing information and instructions to be executed by the processor 404. The main memory 406 may also be used for storing temporary variables or other intermediate information during execution of instructions to be executed by the processor 404.

The computer system 400 may further include a read only memory (ROM) 408 or other static storage device coupled to the bus 402 for storing static information and instructions for the processor 404. A storage device 410, such as a flash or other non-volatile memory may be coupled to the bus 402 for storing information and instructions.

The computer system 400 may be coupled via the bus 402 to a display 412, such as a liquid crystal display (LCD), for displaying information. One or more user input devices, such as the example user input device 414 may be coupled to the bus 402, and may be configured for receiving various user inputs, such as user command selections and communicating these to the processor 404, or to the main memory 406. The user input device 414 may include physical structure, or virtual implementation, or both, providing user input modes or options, for controlling, for example, a cursor, visible to a user through display 412 or through other techniques, and such modes or operations may include, for example virtual mouse, trackball, or cursor direction keys among other cursor controls 416.

The computer system 400 may include respective resources of the processor 404 executing, in an overlapping or interleaved manner, respective program instructions. Instructions may be read into the main memory 406 from another machine-readable medium, such as the storage device 410. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 410. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine. As used herein, computer storage media is a computer-readable medium that does not include transmission media. As such, computer storage media in non-transitory.

The computer system 400 may also include a communication interface 418 coupled to the bus 402, for two-way data communication coupling to a network link 420 connected to a local network 422. The network link 420 may provide data communication through one or more networks to other data devices. For example, the network link 420 may provide a connection through the local network 422 to a host computer 424 or to data equipment operated by an Internet Service Provider (ISP) 426 to access through the Internet 428 a server 430, for example, to obtain code for an application program.

As will be appreciated from the foregoing, the present technology provides for at least the following aspects and examples. In an aspect, the present technology relates to a system with a display, a processor, and a computer-readable medium having instructions that, when executed by the processor, cause the processor to control the system to perform operations. The operations include displaying, on the display, a first web browser application window for a web browser application having multiple open tabs, including a first tab and a second tab, the first tab being active in the first web browser application window; receiving an input to cause the first web browser application window to be snapped to a position on the display; in response to the input, displaying a pending-zone indicator, indicating a zone of the display, including a tab representation for the second tab; receiving a selection of the tab representation; in response to receiving the selection of the tab representation, causing a second web browser application window to be generated to host the second tab; and displaying, concurrently with the snapped first web browser application window, the second web browser application window with the second tab as an active tab.

Implementations may include one or more of the following features. The system where the operations further may include, in response to receiving the selection of the tab representation, causing the second tab to be removed from the first web browser application window. The system where the tab representation includes a preview of content of the second tab. The system where the tab representation includes a title segment with a web page title for a web page of the second tab. The system where the operations further may include generating an additional tab representation for a closed tab. The system where the additional tab representation is generated based on the closed tab being at least one of a most-recently-used tab or a most-frequently-used tab.

Implementations of the described techniques may include hardware, a method or process, or a computer tangible medium.

In another aspect, the technology relates to a computer-implemented method that includes displaying, on a display, a first web browser application window and a second web browser application window, where: the first web browser application window has a first tab and a second tab open, with the first tab being an active tab; the second web browser application window has a third tab and a fourth tab open with the third tab being an active tab; receiving an input to cause the first web browser application window to be snapped to a position of the display; in response to the input, displaying a pending-zone indicator indicating a zone of the display, the pending-zone indicator including: an application-window representation for the second web browser application window, the application-window representation including a preview of content for the third tab; a first tab representation for the second tab; and a second tab representation for the fourth tab. The computer-implemented method may also include receiving a selection of the second tab representation. The method may furthermore include in response to receiving the selection of the second tab representation: causing the second web browser application window to be resized and repositioned to fill the zone corresponding to the pending-zone indicator; and causing the fourth tab to be the active tab in the second web browser application window.

Implementations may include one or more of the following features. The method where the application-window representation includes a title bar and a content area, and the application-window representation includes an image of the title bar and content area. The method where the second tab representation includes: a preview of a web page for the fourth tab; and a title segment, the title segment including a title of the web page. The method where the title segment includes a favicon for the web page. The method where the first tab representation includes a selectable close element, and the method further may include: receiving a selection of the close element; and in response to the selection of the close element, causing the second tab to be closed from the first web browser application window. The method where the first tab representation and the second tab representation are organized in the pending-zone indicator based on when the second tab and the fourth tab were most recently used. The method may include generating a third tab representation for a closed tab. The method where a tab representation is not displayed for the third tab.

In another aspect, the present technology relates to a computer-implemented method that may include displaying a plurality of application windows, the plurality of application windows including at least one application window for a web browser application having multiple open tabs, the multiple open tabs including at least one active tab and multiple inactive tabs. The computer—implemented method may also include receiving an input to invoke a snap assist mode. The method may furthermore include in response to the input, display a snap assist user interface to reconfigure the display of one or more the plurality of the application windows, the snap assist user interface having: tab representations for at least two of the inactive tabs; and an application-window representation for at least one of the plurality of application windows; receiving a selection of one of the tab representations; and in response to receiving the selection: causing a web browser application window to be displayed in a position indicated in the snap assist user interface; and causing a tab corresponding to the selected tab representation to be the active tab in the displayed web browser application window.

Implementations may include one or more of the following features. The method where the web browser application window is one of the plurality of application windows. The method may include in response to receiving the selection, removing the tab corresponding to the selected tab representation from one of the plurality of application windows. The method where the web browser application window is a newly launched web browser application window. The method where the tab representations include an image of web page content for the corresponding tabs. The method where the tab representations include a title segment with a title of a web page of the corresponding tabs. Implementations of the described techniques may include hardware, a method or process, or a computer tangible medium.

Aspects of the present disclosure, for example, are described above with reference to block diagrams and/or operational illustrations of methods, systems, and computer program products according to aspects of the present disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for reconfiguring application windows in a display, the system comprising:
   a display;
   a processor; and
   a computer-readable medium comprising instructions that, when executed by the processor, cause the processor to control the system to perform operations comprising:
      displaying, on the display, a first web browser application window for a web browser application having multiple open tabs, including a first tab and a second tab, the first tab being active in the first web browser application window;
      receiving an input to cause the first web browser application window to be snapped to a position on the display;
      in response to receiving the input, snapping the first web browser application window by automatically repositioning and resizing the first web browser application window to a predefined zone of the display;
      in response to the snapping of the first web browser application window, displaying a pending-zone indicator concurrently with displaying the first web browser application window in the snapped position on the display, the pending-zone indicator indicating a portion of the display that a selected application window will fill;
      displaying a tab representation for the second tab within the pending-zone indicator;
      receiving a selection of the tab representation;
      in response to receiving the selection of the tab representation, causing a second web browser application window to be generated to host the second tab; and
      displaying, concurrently with the snapped first web browser application window, the second web browser application window with the second tab as an active tab, wherein the second web browser application window fills the pending-zone indicator.

2. The system of claim 1, wherein the operations further comprise, in response to receiving the selection of the tab representation, causing the second tab to be removed from the first web browser application window.

3. The system of claim 1, wherein the tab representation includes a preview of content of the second tab.

4. The system of claim 1, wherein the tab representation includes a title segment with a web page title for a web page of the second tab.

5. The system of claim 1, wherein the operations further comprise generating an additional tab representation for a closed tab.

6. The system of claim 5, wherein the additional tab representation is generated based on the closed tab being at least one of a most-recently-used tab or a most-frequently-used tab.

7. The system of claim 1, wherein the input to cause the first web browser application window to be snapped is one of a keyboard key combination, a drag-and-drop input dragging the first web browser application window to a border of the display, or a drag-and-drop input dragging the first web browser application window onto a snap zone of a displayed layout menu.

8. A computer-implemented method for reconfiguring application windows in a display, the method comprising:
   displaying, on a display, a first web browser application window and a second web browser application window, wherein:
   the first web browser application window has a first tab and a second tab open, with the first tab being an active tab;
   the second web browser application window has a third tab and a fourth tab open with the third tab being an active tab;
   receiving an input to cause the first web browser application window to be snapped to a position of the display;
   in response to receiving the input:
      snapping the first web browser application window by automatically repositioning and resizing the first web browser application window to a predefined zone of the display, and
      displaying, adjacent to and concurrently with the first web browser application window in the snapped position, a pending-zone indicator indicating a zone of the display that a selected application window will fill, the pending-zone indicator including:
an application-window representation for the second web browser application window, the application-window representation including a preview of content for the third tab;
a first tab representation for the second tab; and
a second tab representation for the fourth tab;
receiving a selection of the second tab representation; and
in response to receiving the selection of the second tab representation:
causing the second web browser application window to be resized and repositioned to fill the zone corresponding to the pending-zone indicator; and
causing the fourth tab to be the active tab in the second web browser application window.

9. The method of claim 8, wherein the application-window representation includes a title bar and a content area, and the application-window representation includes an image of the title bar and content area.

10. The method of claim 8, wherein the second tab representation includes:

a preview of a web page for the fourth tab; and
a title segment, the title segment including a title of the web page.

11. The method of claim 10, wherein the title segment includes a favicon for the web page.

12. The method of claim 8, wherein the first tab representation includes a selectable close element, and the method further comprises:
receiving a selection of the close element; and
in response to the selection of the close element, causing the second tab to be closed from the first web browser application window.

13. The method of claim 8, wherein the first tab representation and the second tab representation are organized in the pending-zone indicator based on when the second tab and the fourth tab were most recently used.

14. The method of claim 8, further comprising generating a third tab representation for a closed tab.

15. The method of claim 8, wherein a tab representation is not displayed for the third tab.

* * * * *